(12) United States Patent  
Asada (10) Patent No.: US 6,885,805 B2  
(45) Date of Patent: Apr. 26, 2005

(54) OPTICAL FIBER GUIDE DEVICE (75) Inventor: Kazuhiro Asada, Nagoya (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 3 days.

(21) Appl. No.: 09/944,195

(22) Filed: Sep. 4, 2001

(65) Prior Publication Data

US 2002/0031322 A1 Mar. 14, 2002

(30) Foreign Application Priority Data

Sep. 11, 2000 (JP) ..................................... P2000-274506

(51) Int. Cl.$^7$ ................................................ G02B 6/00
(52) U.S. Cl. .................. 385/134; 385/137; 385/147
(58) Field of Search .......................... 385/134–137, 385/147

(56) References Cited

U.S. PATENT DOCUMENTS

| | | | |
|---|---|---|---|
| 3,038,702 A | 6/1962 | Trunnell | 254/134.3 |
| 4,372,511 A | 2/1983 | Knowles | 248/68.1 |
| 5,240,209 A * | 8/1993 | Kutsch | 248/49 |
| 5,503,369 A | 4/1996 | Frost et al. | 254/134.3 |
| 5,530,787 A | 6/1996 | Arnett | 385/137 |
| 5,724,469 A * | 3/1998 | Orlando | 385/135 |
| 5,917,982 A * | 6/1999 | Vargas et al. | 385/134 |
| 5,929,380 A * | 7/1999 | Carlson, Jr. et al. | 174/68.3 |
| 6,049,040 A * | 4/2000 | Biles et al. | 174/68.3 |
| 6,388,193 B2 * | 5/2002 | Maynard et al. | 174/59 |
| 6,389,211 B1 * | 5/2002 | Mandry et al. | 385/135 |
| 6,424,779 B1 * | 7/2002 | Ellison et al. | 385/134 |
| 6,470,129 B1 * | 10/2002 | Wentworth et al. | 385/134 |
| 6,496,642 B2 * | 12/2002 | Gonzalez | 385/136 |
| 6,504,988 B1 * | 1/2003 | Trebesch et al. | 385/135 |
| 6,567,602 B2 * | 5/2003 | Cole et al. | 385/136 |
| 2002/0039476 A1 * | 4/2002 | Sauve et al. | 385/134 |
| 2002/0121571 A1 * | 9/2002 | Ferris et al. | 242/615 |

FOREIGN PATENT DOCUMENTS

EP 0 697 610 A1 2/1996

* cited by examiner

*Primary Examiner*—Akm Enayet Ullah  
*Assistant Examiner*—Kevin S. Wood  
(74) *Attorney, Agent, or Firm*—Oliff & Berridge, PLC (57) ABSTRACT

An optical fiber cord 1 is guided and held in a fixed bent shape in a tubular guide body 10 which is bent in an arc. The guide body 10 is integrally provided with a mounting part 20 which can be attached to a vehicle body or the like, and by fitting this mounting part to the body or the like, installation of the optical fiber cord 1 can be conducted.

6 Claims, 5 Drawing Sheets

OPTICAL FIBER GUIDE DEVICE

BACKGROUND OF THE INVENTION

1. Field of the Invention

The present invention relates to an art for installing an optical fiber cord in an interior and exterior of an automobile, an apparatus, and so on.

2. Description of the Related Art

When an abrupt bending has been applied to the optical fiber cord, a loss of light will be increased in a bent part. For this reason, in case where the optical fiber cord is installed in an automobile or the like for example, the installation work must be conducted with a careful attention so that an abrupt bending may not be applied to the optical fiber cord, as compared with a case of installing a wire harness for electric wiring.

Especially, in such a region that the optical fiber cord must be installed in a bent state, it is necessary to bear in mind that the relevant optical fiber cord should be gently bent so that an abrupt bending may not be applied thereto, and that a bent shape of the optical fiber cord should be constantly maintained.

SUMMARY OF THE INVENTION

In view of the above, it is an object of the invention to provide an optical fiber guide device by means of which an optical fiber cord can be installed easily in a state where it is maintained in a fixed bent shape so that an abrupt bending may not be applied.

In order to achieve the above object, according to the invention, there is provided an optical fiber guide device comprising a guide body provided with a guide groove or a guide channel which can guide and hold an optical fiber cord received and arranged therein in a fixed bent shape, and a mounting part provided on an outer face of the guide body and adapted to be fitted to an object of installation in which the optical fiber cord is to be installed.

It is more advantageous that the guide groove or the guide channel is formed in a shape bent at a bending radius which is larger than the smallest bending radius of the optical fiber cord.

Moreover, the guide body may be so constructed that it includes a guide receiving part which is formed in a shape of trough having a substantially U-shape in cross section and bent in its lateral direction, and can receive and arrange the optical fiber cord through an opening formed in its longitudinal direction, and a lid part adapted to be attached to the guide receiving part so as to close the opening.

Further, either one of the guide receiving part and the lid part may be provided with stoppers which extend in a direction perpendicular to an axial direction of the optical fiber cord so as to clamp the optical fiber cord which is received and arranged in the guide receiving part from both sides, and bite a coating of the optical fiber cord received and arranged in the guide receiving part thereby to position and hold the optical fiber cord in its axial direction.

In case of guiding and holding an optical fiber cord of a multi-core parallel arranged type in which a plurality of optical fibers are coupled in parallel, the guide body may be provided with a guide groove or a guide channel which can contain and hold the optical fiber cord in a posture where the optical fibers can be bent at the same bending radius.

DETAILED DESCRIPTION OF THE PREFERRED EMBODIMENTS

Now, an embodiment of the invention will be described hereunder.

Figure 1:
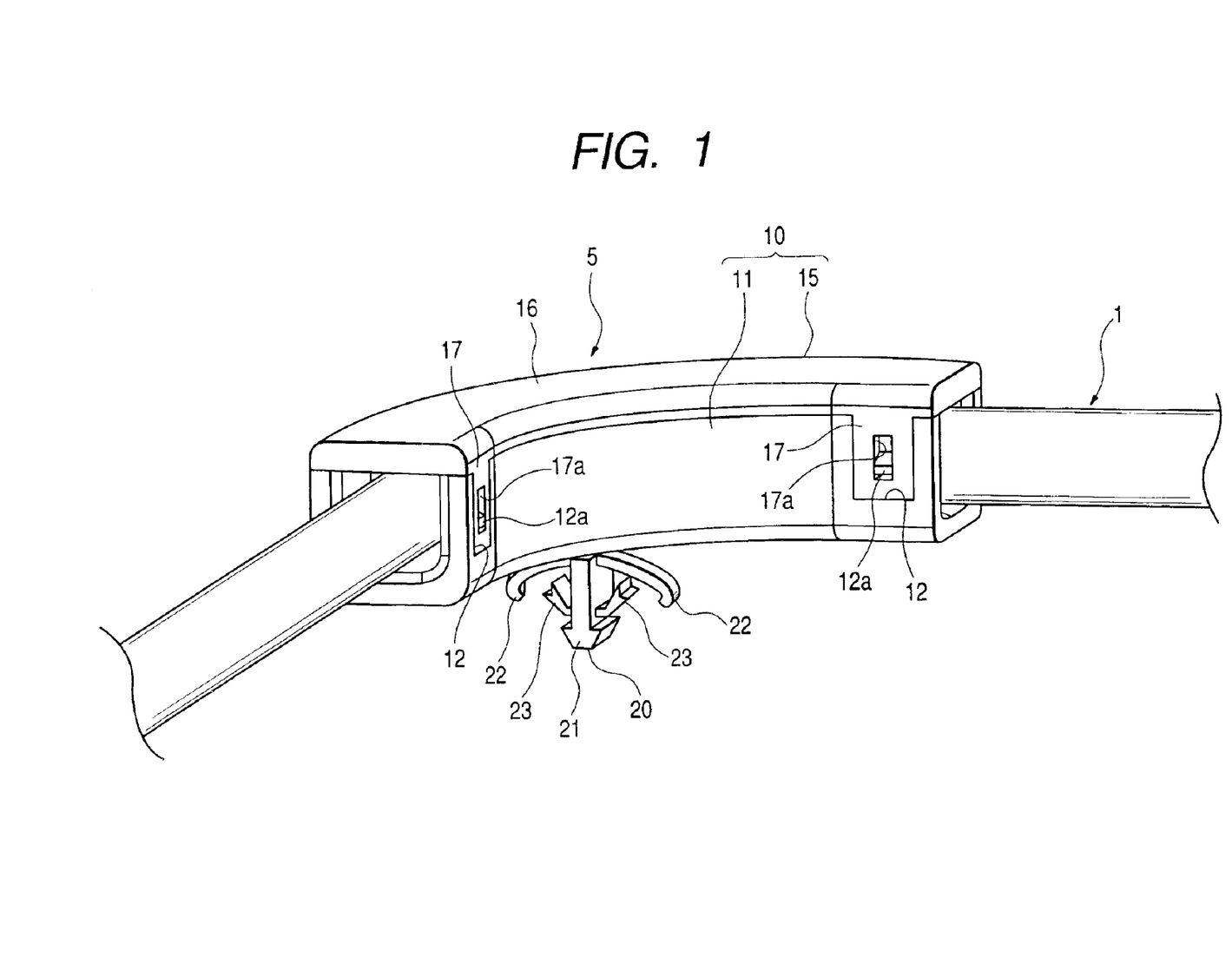
FIG. 1 is a perspective view showing an optical fiber guide device according to an embodiment of the invention.
Figure 2:
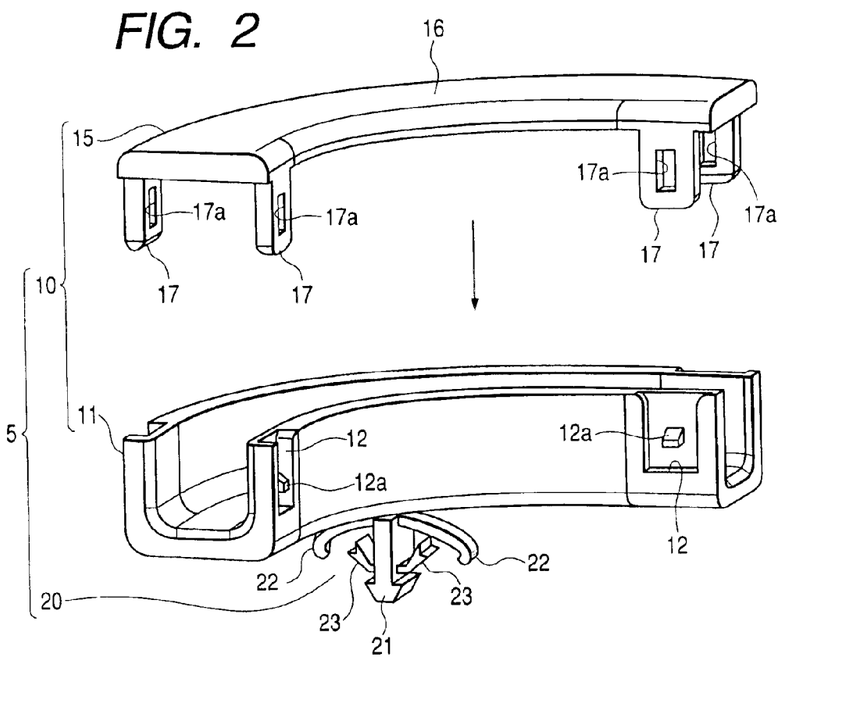
FIG. 2 is an exploded perspective view of the optical fiber guide device of FIG. 1.

As shown in FIGS. 1 and 2, this optical fiber guide device 5 is designed for guiding and holding an optical fiber cord 1 which is composed of an optical fiber consisting of a core and a clad, and one layer or a plurality of layers of coating formed around the optical fiber. The optical fiber guide device 5 includes a guide body 10 in a substantially tubular shape and a mounting part 20 provided on an outer face of this guide body 10.

The above mentioned guide body 10 is generally formed in a substantially tubular shape rectangular in cross section whose tubular axis is bent in an arc, and the aforesaid optical fiber cord 1 is received and arranged therein along the tubular axis. In this manner, the relevant optical fiber cord 1 can be guided and held in a fixed bent shape following the tubular axis thus bent.

Moreover, this guide body 10 is formed having a shape bent at a determined bending radius of the tubular axis which is larger than the determined smallest bending radius (for example, a bending radius of 15 mm) related to light transmitting characteristic of the optical fiber cord 1. This enables the optical fiber cord 1 to be guided and held in the relevant guide body 10 in the fixed bent shape in which it has been bent at the determined bending radius larger than the smallest bending radius. It is to be noted that the smallest bending radius of the optical fiber cord 1 means such a value given according to the characteristic of the optical fiber cord 1 that in case where the optical fiber cord 1 has been bent at a larger bending radius than the value, a leakage of light from the optical fiber will increase and incur a serious loss of light to an extent that optical communication may be hindered (evaluated as a bending radius which will occur a light loss of 5%, for example).

In this embodiment, a general shape of the guide body 10 is such that it has been bent in an arc having a central angle of 90 degree so as to hold the optical fiber cord 1 in a state where its direction has been changed at about 90 degree. However, the guide body 10 may be also bent in an arc having the central angle of larger or smaller than 90 degree, in case where the optical fiber cord 1 is intended to be held in a state where the direction has been changed at an angle larger or smaller than 90 degree. Moreover, although in this embodiment, the guide body 10 is bent in an arc along its entire length in a longitudinal direction, only a portion of the guide body 10 may be bent in an arc, while the other portion may extend rectilinearly. Further, although the guide body 10 is bent in two dimensions in a determined plane in this embodiment, it may be bent in three dimensions.

Furthermore, in this embodiment, the guide body 10 is composed of a guide receiving part 11 which is formed in a shape of trough having a substantially U-shape in cross section and bent in an arc in an axial direction, and a lid part 15 for closing an arc-shaped opening of this guide receiving part 11.

The above mentioned guide receiving part 11 is formed in the shape of trough having an inner peripheral shape slightly larger than an outer peripheral shape of the optical fiber cord 1. When the optical fiber cord 1 has been received and arranged inside the guide receiving part 11 through the arc-shaped opening (the opening located upward in FIGS. 1 and 2) formed along its longitudinal direction, the optical fiber cord 1 will be guided and held in the fixed bent shape in which it axial direction is arranged along an axial direction of the guide receiving part 11.

The lid part 15 includes a lid body 16 having a plate-like shape in a substantially arc shape as seen in a plan view corresponding to the arc-shaped opening of the guide receiving part 11. The lid part 15 is adapted to close the arc-shaped opening of the guide receiving part 11.

Two pairs of locking pieces 17 having locking holes 17a are respectively suspended downward from both ends of the lid body 16, and on the other hand, recesses 12 are formed at both end areas of the guide receiving part 11 on an outer face of its inner peripheral wall and an outer face of its outer peripheral wall. There are formed, in the recesses 12, locking projections 12a which can be engaged with the above mentioned locking holes 17a. By fitting the locking pieces 17 in the respective recesses 12 from the above in a state where the optical fiber cord 1 has been received and arranged in the guide receiving part 11, the locking projections 12a are slid along the respective locking pieces 17 so as to once widen the relevant locking pieces 17 outward. Then, the locking projections 12a are engaged with the locking holes 17a, and thus, the relevant lid part 15 can be fitted to the guide receiving part 11 in a state where the arc-shaped opening of the guide receiving part 11 has been closed. In this manner, the arc-shaped opening of the guide receiving part 11 will be closed with the lid part 15, and protection of the optical fiber cord 1 and prevention of the optical fiber cord 1 from jumping out of the guide receiving part 11 can be attained.

The mounting part 20 is provided on an outer face of the guide body 10. By fitting this mounting part 20 to an object of installation in which the optical fiber cord 1 is to be installed (a vehicle body in case of installing, for example, in an automobile), the relevant guide body 10 is arranged and fixed at a determined position with respect to the object of installation.

Figure 3:
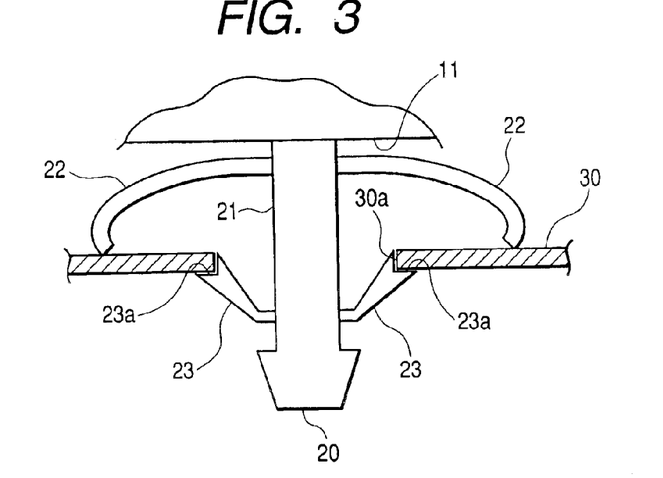
FIG. 3 is an enlarged side view partly in section of an essential part of the optical fiber guide device of FIG. 1 in a state fitted to an object of installation.

More specifically, in this embodiment, a mounting hole 30a is formed, as shown in FIGS. 1 to 3, in the object of installation 30 in a form of a sheet metal such as the vehicle body, for example, in which the optical fiber cord 1 is to be installed. By inserting the mounting part 20 into this mounting hole 30a to be engaged with a circumferential edge of the mounting hole 30a, the mounting part 20 is designed to be fitted to the object of installation 30 (See FIG. 3).

In other words, the mounting part 20 has a fitting post 21, a pair of first locking pieces 22 formed at a base end of the fitting post 21, and a pair of second locking pieces 23 formed at a distal end of the fitting port 21.

The pair of the second locking pieces 23 extend diagonally outwardly from the distal end of the fitting post 21 toward the base end thereof, and a distance between respective ends of the pair of the second locking pieces 23 is larger than an inner diameter of the mounting hole 30a. The pair of the first locking pieces 22 extend diagonally outwardly from the base end of the fitting post 21 toward the distal end thereof, and a distance between respective ends of the pair of the first locking pieces 22 is further larger than the distance between the ends of the pair of the second locking pieces 23. Moreover, the ends of the pair of the first locking pieces 22 extend a little beyond the ends of the pair of the second locking pieces 23 toward the distal end of the fitting post 21. When the mounting part 20 is inserted into the mounting hole 30a in the object of installation 30 from its front face side, outer faces of the pair of the second locking pieces 23 slidably get in contact with the circumferential edge of the mounting hole 30a and the pair of the second locking pieces 23 are elastically deformed so as to be pushed inwardly. After the pair of the second locking pieces 23 have overridden the circumferential edge of the mounting hole 30a, the ends of the pair of the second locking pieces 23 are elastically abutted against the circumferential edge of the mounting hole 30a in the object of installation 30 at a back face side thereof. At the same time, the ends of the pair of the first locking pieces 22 are elastically abutted against the circumferential edge of the mounting hole 30a in the object of installation 30 at the front face side thereof. As the results, the mounting part 20 is fitted to the object of installation 30 in such a manner that the object of installation 30 is clamped between the pair of the second locking pieces 23 and the pair of the first locking pieces 22 around the mounting hole 30a from both the back and the front face sides.

Further, in this embodiment, the ends of the pair of the second locking pieces 23 are respectively provided with grooves 23a which can be engaged with the circumferential edge of the mounting hole 30a. By engaging the grooves 23a with the circumferential edge of the mounting hole 30a in a state where the mounting part 20 has been mounted on the object of installation 30, the mounting part 20 can be more accurately fixed at a determined position with respect to the object of installation 30.

It is to be noted that the structure of the mounting part 20 is not limited to the above described structure, but, may be in a form of split pins to be engaged with the area around the mounting hole 30a in the object of installation 30.

Installation of the optical fiber cord 1 employing the optical fiber guide device 5 constructed as above will be conducted in the following manner.

As a first step, the optical fiber cord 1 is received and arranged in the guide receiving part 11 through its arc-shaped opening. Then, the lid part 15 is attached to the arc-shaped opening. Thereafter, the mounting part 20 is fitted to the object of installation 30 by press fitting the mounting part 20 into the mounting hole 30a formed in the object of installation 30. In this manner, the optical fiber cord 1 is installed in the object of installation in a state where it is maintained in the fixed bent shape.

Because the optical fiber guide device 5 which is constructed as above includes the guide body 10 which can guide and hold the optical fiber cord 1 contained and arranged therein in the fixed bent shape, the optical fiber guide device 5 enables the guide body 10 to guide and hold the relevant optical fiber cord 1 in the fixed bent shape, while preventing an abrupt bending which would be applied to the optical fiber cord 1.

In addition, because the optical fiber guide device 5 is provided with the mounting part 20 which can be fitted to the object of installation 30, the optical fiber guide device 5 can be mounted on the object of installation by way of the mounting part 20, and thus, the optical fiber cord 1 can be easily installed.

Especially in this embodiment, the guide body 10 holds the optical fiber cord 1 in the bent shape having the determined bending radius larger than the smallest bending radius. As the result, light loss in the optical fiber cord 1 guided and held by the optical fiber guide device 5 can be depressed low.

Although in this embodiment, the guide body 10 is formed in a substantially tubular shape having a guide channel as its general shape, it may be formed in a semi-cylindrical shape (a trough shape) having a guide groove.

However, provided that the guide body 10 is so constructed that it includes the guide receiving part 11 which is formed in a shape of trough having a substantially U-shape in cross section and bent in its lateral direction, and can receive and arrange the optical fiber cord 1 through the arc-shaped opening formed along its longitudinal direction, and the lid part 15 adapted to be attached so as to cover the arc-shaped opening, as in this embodiment, after the optical fiber cord 1 has been received and arranged in the guide receiving part 11 through the arc-shaped opening, the lid part 15 is attached so as to cover the arc-shaped opening, and thus, the optical fiber cord 1 can be easily guided and held by the guide body 10. In addition, the optical fiber cord 1 can be surrounded and protected by the guide receiving part 11 and the lid part 15 from all directions so that it may be effectively prevented from damages from outside.

MODIFIED EXAMPLE 1

Figure 4:
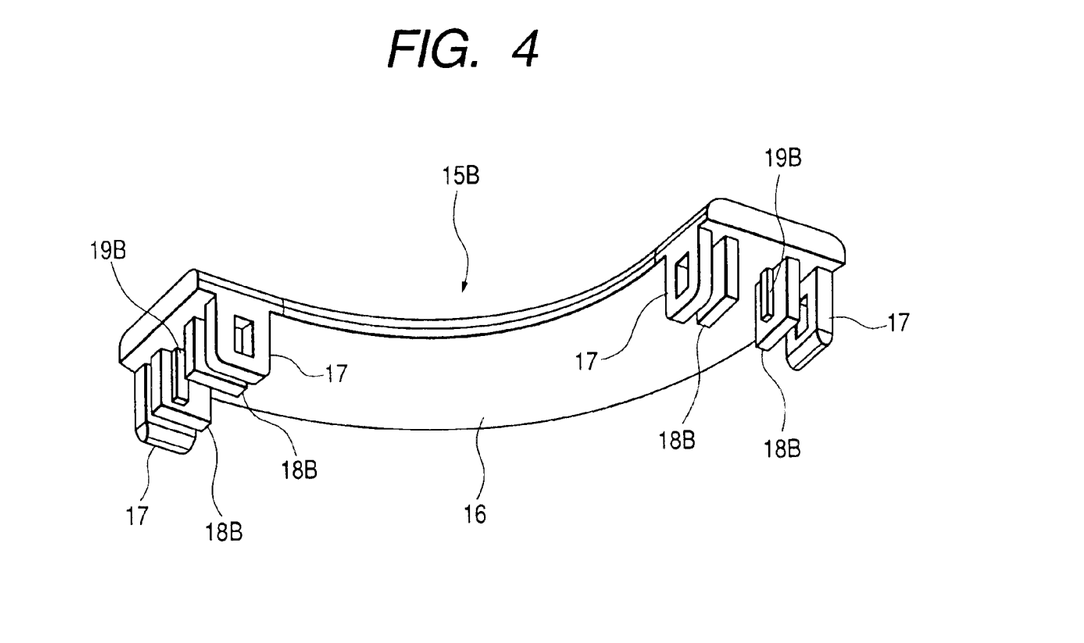
FIG. 4 is a perspective view showing a lid part according to a modified example 1.

In place of the lid part 15 in the optical fiber guide device 5 of the above described embodiment, a lid part 15B as shown in FIG. 4 may be employed.

Figure 5:
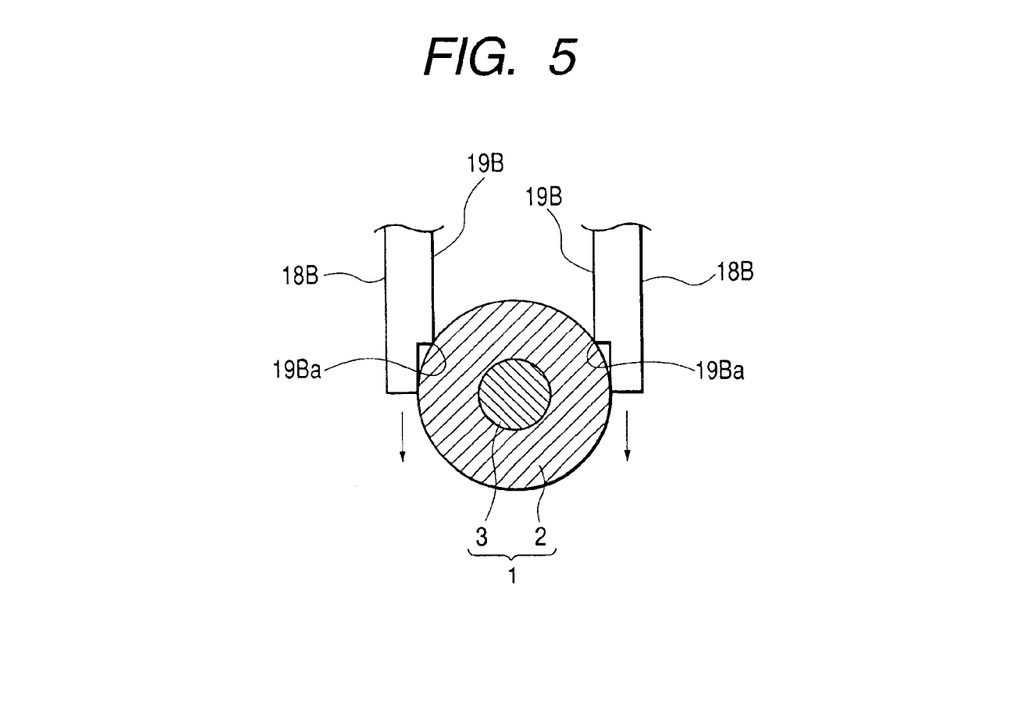
FIG. 5 is an enlarged sectional view of an essential part showing a work step for positioning and holding an optical fiber cord in the modified example of FIG. 4.
Figure 6:
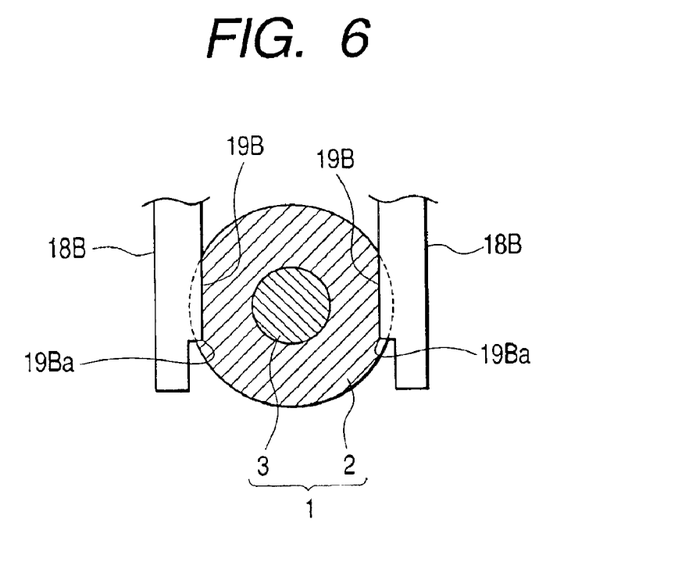
FIG. 6 is an enlarged sectional view of an essential part showing the optical fiber cord in a state positioned and held in the modified example of FIG. 4.

In particular, this lid part 15B is provided, as shown in FIGS. 4 to 6, with two pairs of extending pieces 18B which are respectively suspended from both ends of a lid body 16 having a similar structure to the one in the above described embodiment and extend so as to clamp the optical fiber cord 1 which has been received and arranged in the guide receiving part 11, from both sides thereof. Each pair of the extending pieces 18B are provided at their inner faces with rib-like stoppers 19B opposed to each other. The rib-like stoppers 19B are formed in a direction perpendicular to an axial direction of the optical fiber cord 1 received and arranged in the guide receiving part 11 and along an extending direction of the extending pieces 18B. Each of the stoppers 19B is formed in a shape of rectangular column, and a corner area embraced between its inner face and lower face is designed as a biting edge 19Ba which extends in the axial direction of the optical fiber cord 1. A distance between the stoppers 19B is slightly smaller than the diameter of the optical fiber cord 1 (See FIGS. 5 and 6).

In the state where the optical fiber cord 1 has been received and arranged in the guide receiving part 11, the lid part 15B is attached to the arc-shaped opening of the guide receiving part 11 in such a manner that the extending pieces 18B are pushed into between the outer peripheral face of the optical fiber cord 1 and inner faces of side walls of the guide receiving part 11. The biting edges 19Ba are first abutted against an outer peripheral face of the coating 2 of the optical fiber cord 1 at diagonally upper positions thereof. By further pushing the lid part 15B downward, the biting edges 19Ba shave the coating 2 like a planer. The stoppers 19 bite the coating 2 while pushing the shaved parts aside in a pushing direction and continue to move downward. Finally, in a state where the lid part 15B has shut the arc-shaped opening of the guide receiving part 11, the stoppers 19B have bitten the areas of the coating 2 which have been shaved off by the biting edges 19Ba as shown in FIG. 6, thereby to position and hold the relevant optical fiber cord 1 in the axial direction.

In this modified example 1, because the stoppers 19B have bitten the coating 2 to position and hold the relevant optical fiber cord 1 in the axial direction, the relevant optical fiber cord 1 will be hardly displaced from the guide body 10, even though the optical fiber cord 1 may be pulled after the lid part 15B has been attached to the guide receiving part 11. Consequently, even though a pulling force is applied to the optical fiber cord 1 after the installation of the optical fiber cord 1, slackening of the optical fiber cord 1 or its displacement from an installing path may hardly occur.

In addition, the stoppers 19B are provided with the biting edges 19Ba which shave off the coating 2 of the optical fiber cord 1 and enable the stoppers 19B to bite the coating 2. Consequently, not only when the stoppers 19B are pushed in, but when the optical fiber cord 1 is held by the stoppers 19B, the stoppers 19B will rarely exert excessive pushing forces which would compress the optical fiber 3 inside the optical fiber cord 1 in its diametrical direction. As the results, there will be an advantage that a least distortion may occur in the optical fiber 3, and the light loss can be depressed low.

The position and the number of the stoppers 19B may be appropriately changed according to strength required for fixing the optical fiber cord 1.

Although the stoppers 19B are formed on the lid part 15B in this modified example 1, they may be formed on the guide receiving part 11.

MODIFIED EXAMPLE 2

Figure 7A:
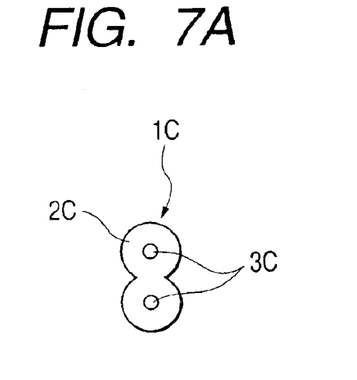
FIG. 7A is a sectional view showing an optical fiber cord of two-cores parallel arranged type.
Figure 7B:
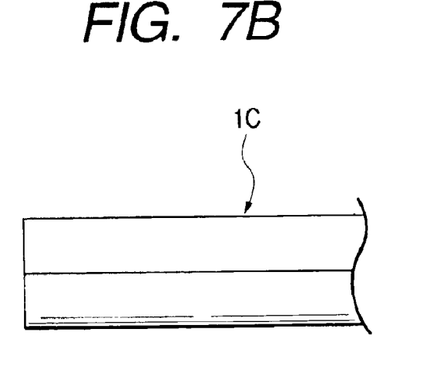
FIG. 7B is a side view of the optical fiber cord.
Figure 8:
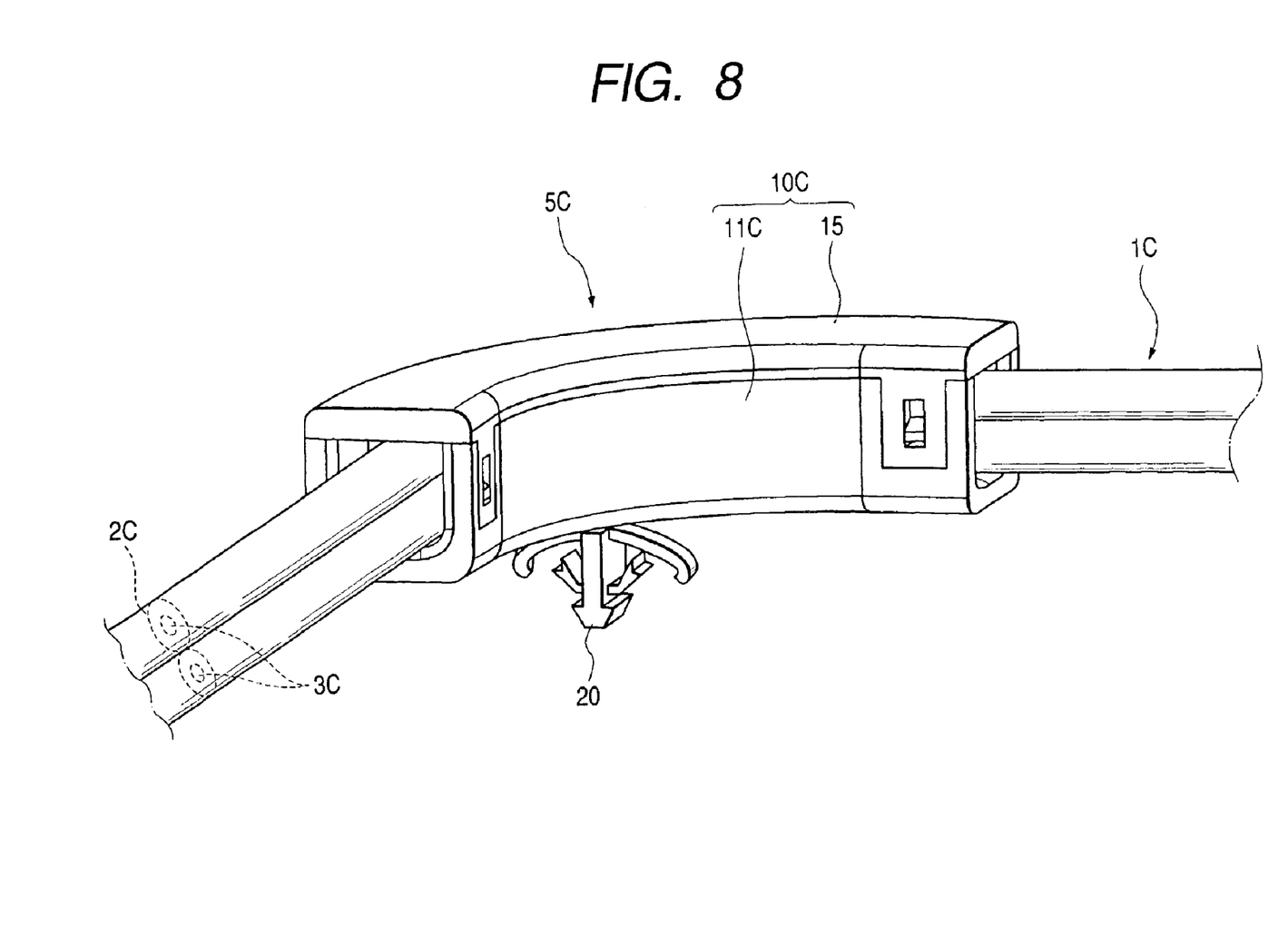
FIG. 8 is a perspective view of an optical fiber guide device according to a modified example 2.

In case of guiding and holding an optical fiber cord 1C of a multi-core parallel arranged type in which a plurality of (two, in this modified example 2) optical fibers 3C are coupled in parallel by means of a coating 2C as shown in FIG. 7, in a state where the optical fiber cord 1C is bent in two dimensions in a determined plane, the guide body may be so constructed, like a guide body 10C as shown in FIG. 8, that the relevant optical fiber cord 1C may be received and held in such a posture that all the optical fibers 3C of the optical fiber cord 1C guided and held therein may be bent at the same bending radius.

In other words, an inner peripheral face of a guide receiving part 11C of the guide part 10C has a shape of an elongated hole which is longer in cross section in a vertical direction perpendicular to the determined plane, and the optical fiber cord 1C is received and held therein having the optical fibers 3C arranged in the vertical direction so that all the optical fibers 3C are held in a state bent at the same bending radius.

In this optical fiber guide device 5C according to the modified example 2, the optical fiber cord 1C can be received and held in the guide receiving part 11C in a state bent in an easily bendable direction, and so, insertion and arrangement of the optical fiber cord 1C into the guide receiving part 11C can be easily conducted. Moreover, the optical fibers 3C of the relevant optical fiber cord 1C will be rarely subjected to an unreasonable force such as distortion, etc., and accordingly, an increase of light loss in the optical fibers 3C can be prevented.

It is to be noted that this modified example 2 may be combined with the above described modified example 1.

As described herein above, the optical fiber guide device according to the invention comprises the guide body provided with the guide groove or the guide channel which can guide and hold the optical fiber cord received and arranged therein in a fixed bent shape. Therefore, by guiding and holding the optical fiber cord inside, the guide body can hold the optical fiber cord in the fixed bent shape while preventing an abrupt bending which would be applied to the relevant optical fiber cord. In addition, the optical fiber guide device comprises the mounting part provided on an outer face of the guide body and adapted to be fitted to an object of installation in which the optical fiber cord is to be installed. Therefore, by mounting this optical fiber guide device on the object of installation such as a vehicle body by way of the mounting part, the optical fiber cord can be easily installed.

Especially, in the optical fiber guide device in which the guide groove or the guide channel is formed in a shape bent at a bending radius which is larger than the smallest bending radius of the optical fiber cord, a light loss in the optical fiber cord guided and held in the optical fiber guide device can be lowered.

Moreover, in the optical fiber guide device in which the guide body includes the guide receiving part which is formed in a shape of trough having a substantially U-shape in cross section and bent in its lateral direction, and can receive and arrange the optical fiber cord through the opening formed in its longitudinal direction, and the lid part adapted to be attached to the guide receiving part so as to close the opening, the optical fiber cord can be easily guided and held by the guide body in such a manner that the optical fiber cord can be surrounded from all the directions to be sufficiently protected.

Further, provided that either one of the guide receiving part and the lid part is provided with stoppers which extend in a direction perpendicular to an axial direction of the optical fiber cord so as to clamp the optical fiber cord which is received and arranged in the guide receiving part from both sides, and bite a coating of the optical fiber cord received and arranged in the guide receiving part thereby to position and hold the optical fiber cord in its axial direction, positional displacement of the optical fiber cord from the guide body along its axial direction can be prevented.

In case of guiding and holding the optical fiber cord of a multi-core parallel arranged type in which a plurality of optical fibers are coupled in parallel, provided that the guide body includes the guide groove or the guide channel which can contain and hold the optical fiber cord in a posture where the optical fibers can be bent at the same bending radius, the relevant optical fiber cord of the multi-core parallel arranged type can be bent in an easily bendable direction and can be easily guided and held in the guide body.

What is claimed is:

1. An optical fiber guide device comprising:

a guide body operable to guide and hold an optical fiber cord received and bent along an arc therein, said guide body including a guide receiving part having a base bordered substantially perpendicularly by a pair of peripheral walls for flanking said optical fiber cord to form a trough having an opening opposite said base in a substantially U-shape cross-section, said base having a planform following the arc, first and second members of said pair of peripheral walls being respectively convex and concave to said trough, said trough able to receive said optical fiber cord through said opening, said pair of peripheral walls causing said optical fiber cord to bend in said trough along the arc; and a mounting part provided on an outer face of said guide body and adapted to be fitted to an object of installation in which said optical fiber cord is to be installed, wherein said guide body further includes a lid part attachable to said guide receiving part so as to cover said opening, and either one of said guide receiving part and said lid part is provided with stoppers which extend in a direction perpendicular to an axial direction of said optical fiber cord so as to clamp said optical fiber cord which is received and arranged in said guide receiving part from both sides, and bite a coating of said optical fiber cord received and arranged in said guide receiving part thereby to position and hold said optical fiber cord in its axial direction.

2. The optical fiber guide device as claimed in claim 1, wherein said guide groove or said guide channel is formed in a shape bent at a bending radius which is larger than the smallest bending radius of said optical fiber cord.

3. The optical fiber guide device as claimed in claim 1 for guiding and holding an optical fiber cord of a multi-core parallel arranged type in which a plurality of optical fibers are coupled in parallel, wherein said guide body is provided with a guide groove or a guide channel which can contain and hold said optical fiber cord in a posture where said optical fibers can be bent at the same bending radius.

4. An optical fiber guide device comprising:

a guide body operable to guide and hold an optical fiber cord received and bent along an arc therein, said guide body including a guide receiving part having a base bordered substantially perpendicularly by a pair of peripheral walls for flanking said optical fiber cord to form a trough having an opening opposite said base in a substantially U-shape cross-section, said base having a planform following the arc, first and second members of said pair of peripheral walls being respectively convex and concave to said trough, said trough able to receive said optical fiber cord through said opening, said pair of peripheral walls causing said optical fiber cord to bend in said trough along the arc; and a mounting part provided on an outer face of said guide body and adapted to be fitted to an object of installation in which said optical fiber cord is to be installed, wherein said guide body further includes a lid part attachable to said guide receiving part so as to cover said opening, said lid part includes a lid body and at least one projection part disposed substantially perpendicular to said lid body, said receiving part includes at least one recess part for receiving said at least one projection part, and said at least one projection part includes a locking hole, said at least one recess part includes a locking projection that fits into said locking hole to hold said lid part to said receiving part.

5. An optical fiber guide device comprising:

a guide body operable to guide and hold an optical fiber cord received and bent along an arc therein, said guide body including a guide receiving part having a base bordered substantially perpendicularly by a pair of peripheral walls for flanking said optical fiber cord to form a trough having an opening opposite said base in a substantially U-shape cross-section, said base having a planform following the arc, first and second members of said pair of peripheral walls being respectively convex and concave to said trough, said trough able to receive said optical fiber cord through said opening, said pair of peripheral walls causing said optical fiber cord to bend in said trough alone the arc; and a mounting part provided on an outer face of said guide body and adapted to be fitted to an object of installation in which said optical fiber cord is to be installed, wherein said mounting part includes a fitting post extending at a base of the mounting part from said guide body to a distal end for insertion into a mounting hole of an installation, a first pair of locking pieces at said base for impinging against a first surface of said installation, and a second pair of locking pieces at said distal end for impinging against a second surface of said installation after passing through said mounting hole.

6. The optical fiber guide device as claimed in claim 1, wherein said mounting part is formed by locking pieces.

* * * * *